April 19, 1927. 1,625,709
F. CONRAD
SEDIMENT TRAP FOR BOILERS
Filed March 6, 1926
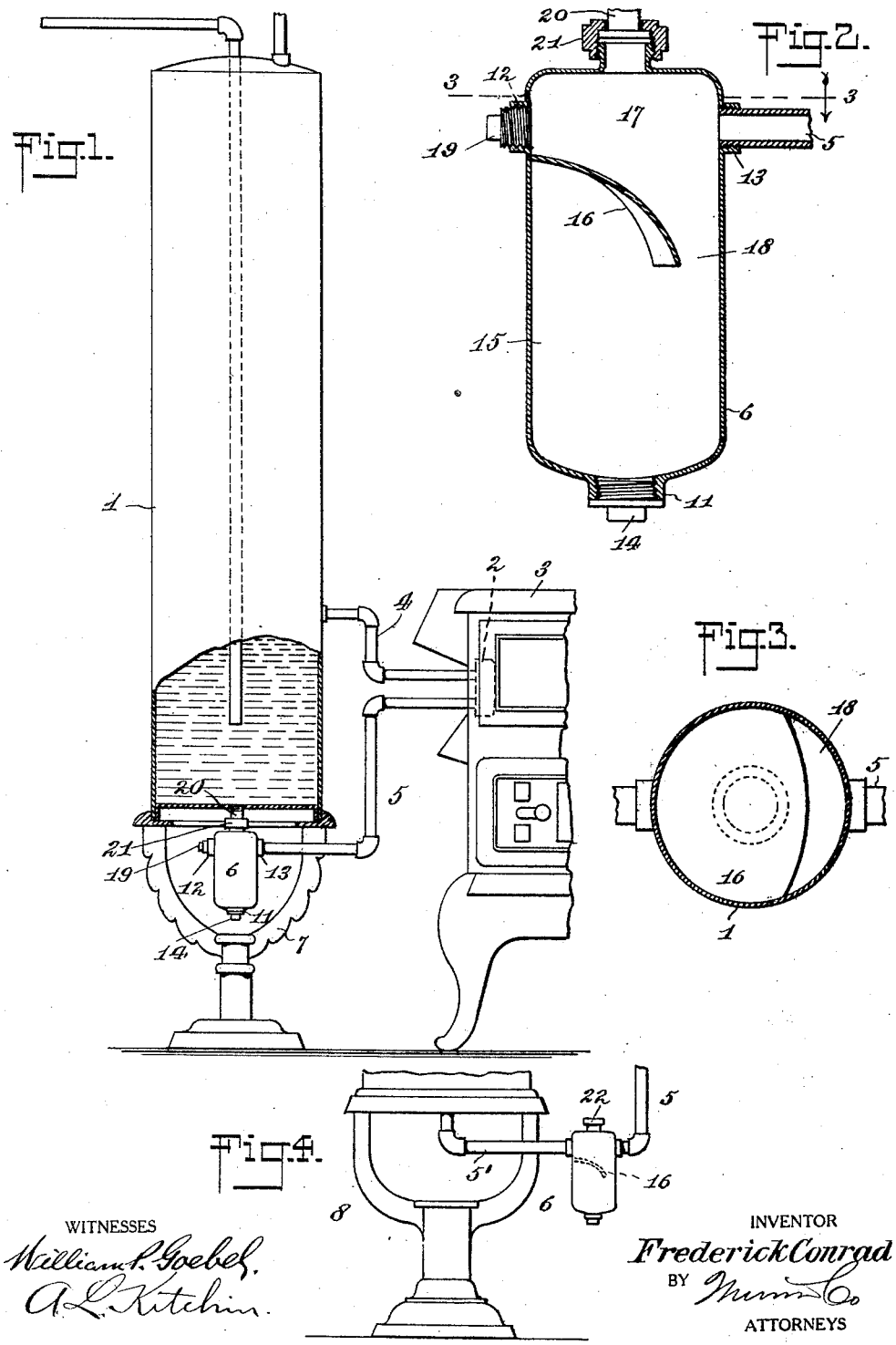
WITNESSES
William P. Goebel
A. L. Kitchin
INVENTOR
Frederick Conrad
BY
ATTORNEYS Patented Apr. 19, 1927.

1,625,709

UNITED STATES PATENT OFFICE.

FREDERICK CONRAD, OF BOGOTA, NEW JERSEY, ASSIGNOR OF ONE-HALF TO BERTHA L. CONRAD, OF BOGOTA, NEW JERSEY.

SEDIMENT TRAP FOR BOILERS.

Application filed March 6, 1926. Serial No. 92,873.

This invention relates to sediment traps for boilers and particularly for domestic boilers and has for an object to provide an improved construction which may be readily used on new or old boilers and act in an efficient manner for receiving and trapping the sediment usually deposited in the lower part of the boiler.

Another object of the invention is to provide a sediment trap for domestic boilers wherein the water from the boiler may freely flow through the trap while allowing the sediment to move in a different path to a storage chamber.

A still further object, more specifically, is to provide a trap for domestic boilers which may be connected to the bottom of the boiler and which may be readily removed at any time or readily cleaned without removal.

In the accompanying drawing—

Figure 1 is an elevation of a domestic boiler with certain parts broken away, the same being shown in connection with part of a stove and with an embodiment of the invention.

Figure 2 is an enlarged vertical sectional view through the trap shown in Figure 1.

Figure 3 is a transverse sectional view through Figure 2 on line 3—3.

Figure 4 is a view similar to the lower part of Figure 1 but showing the arrangement of trap when the boiler stand is comparatively low.

Referring to the accompanying drawing by numerals, 1 indicates a domestic boiler of the usual kind now in common use, said boiler being connected to the water back 2' of stove 3 through the pipes 4 and 5 and through the trap 6. When the trap 6 is not in use, the lower part of pipe 5 is connected to the bottom of the boiler. When the boiler stand 7 is of the proper shape, trap 6 may be arranged directly beneath the boiler as shown in Figure 1 but quite often the stand is made shallow, as for instance, the stand 8 shown in Figure 4 and when this is the case the trap 6 is set off at one side and connected to the bottom of the boiler through a suitable pipe 5'.

The trap 6 is shown in detail in Figures 2 and 3 and from these figures it will be noted that the trap is formed with an elongated casing 9 having top and bottom threaded tubular members 10 and 11 and side threaded tubular members 12 and 13 near the top. A plug 14 normally closes opening 11 but is removed whenever it is desired to clean the sediment from the lower part of the housing 9, said lower part for the purpose of description, being termed the sediment compartment 15. A division plate 16 divides the compartment 15 from the upper or circulating compartment 17. The plate 16 may be horizontal if desired, though preferably it bends downwardly as shown in Figure 2 but makes a top for the compartment 15 except for the comparatively small opening 18, which opening permits the sediment to freely fall into the compartment 15 and permits an equal volume or quantity of water to pass upwardly as the same is displaced by the sediment.

When the trap 6 is arranged as shown in Figure 1, the plug 19 is screwed into the threaded opening 12 and the threaded opening 10 is connected to the boiler 1 by a suitable short pipe 20 and a threaded sleeve 21 which is screwed onto the tubular threaded member 10 and onto pipe 20. This permits the water to freely pass downwardly into the trap 6 and from thence out through the threaded opening 13 and through pipe 5 into the water back 2 from which it will pass through pipe 4 back into boiler 1. As the water circulates in this manner, any sediment that might be carried in the water will, by gravity, drop down through opening 18 into the compartment 15. The compartment 15 may be cleaned from time to time by removing the plug 14 and permitting the sediment and water to flow therefrom. Where the trap 6 is arranged as shown in Figure 4, a cap 22 is provided for member 10 and the water passes in one side at the top of the trap and out the other side.

What I claim is:

1. A sediment trap for domestic boilers comprising a body having top and bottom openings and a pair of side openings near the top, means for closing certain of said openings, and a division plate for dividing the body into upper and lower compartments, said division plate being arranged below said side opening and inclined from the horizontal to almost the vertical so that sediment deposited thereon will move to the lowermost part thereof and then drop into the lower compartment, said lowermost part being spaced from the wall of the body to present a passage-way.

2. A sediment trap for domestic boilers comprising a tubular body open at both ends and having diametrically opposite openings near one end, a plug for closing one of the second mentioned openings, a plug for closing one of the first mentioned openings and a division plate arranged immediately below one of the second mentioned openings, said division plate extending from a substantially horizontal position in a curve to almost a vertical position, the end which is in an almost vertical position being spaced from the casing whereby sediment deposited on the division plate will move under the action of gravity to the lowermost part of the casing.

FREDERICK CONRAD.